United States Patent [19]

Rivero et al.

[11] Patent Number: 5,385,175
[45] Date of Patent: Jan. 31, 1995

[54] CONDUIT HAVING HYDROPHILIC AND OLEOPHOBIC INNER SURFACES FOR OIL TRANSPORTATION

[75] Inventors: Mayela Rivero; Valmore Rodriquez, both of Caracas, Venezuela; Dan Joseph, Minneapolis, Minn.; Emilio Guevara; Nelson Carabaño, both of Caracas, Venezuela

[73] Assignee: Intevep, S.A., Caracas, Venezuela

[21] Appl. No.: 144,008

[22] Filed: Nov. 1, 1993

[51] Int. Cl.6 .......................... F16L 9/16; F17D 1/16
[52] U.S. Cl. ..................... 138/145; 138/103; 138/110; 138/143; 138/175; 137/13
[58] Field of Search ............... 138/103, 110, 137, 140, 138/141, 143, 145, 146, 172, 174, 175, DIG. 6; 137/13; 427/387

[56] References Cited

U.S. PATENT DOCUMENTS

| | | |
|---|---|---|
| 3,639,156 | 2/1972 | Pittman et al. .................... 138/124 |
| 3,892,252 | 1/1975 | Poeltmann .......................... 138/145 |
| 3,977,469 | 8/1976 | Broussard et al. . |
| 4,267,213 | 5/1981 | Beck et al. ......................... 427/387 |
| 4,421,569 | 12/1983 | Dichter et al. ..................... 138/145 |
| 4,421,569 | 12/1983 | Dichter et al. ............... 138/DIG. 6 |
| 5,186,217 | 2/1993 | Kallinich et al. .................. 138/175 |
| 5,207,248 | 5/1993 | Seki et al. ......................... 138/143 |

*Primary Examiner*—James E. Bryant, III
*Attorney, Agent, or Firm*—Bachman & LaPointe

[57] ABSTRACT

A conduit for transporting an oil and water mixture wherein the conduit has an inner surface is substantially hydrophilic and oleophobic. The surface is characterized by a water absorption capacity of greater than or equal to about 8% by weight, and by a contact angle with the oil of greater than or equal to about 120°. The inner surface material may be a silica containing concrete composition or a polymeric coating composition. A conduit having such an inner surface is wetted by water so as to inhibit adhesion of oil to the conduit.

19 Claims, 2 Drawing Sheets

CONDUIT HAVING HYDROPHILIC AND OLEOPHOBIC INNER SURFACES FOR OIL TRANSPORTATION

BACKGROUND OF THE INVENTION

The invention relates to the field of transportation of oil products, especially heavy and extra heavy oil products and, particularly, to a conduit for such transportation which has an inner surface which inhibits adhesion of heavy and extra heavy oil products to the flow surface of the conduit.

Heavy and extra heavy oil is available in abundant supply and is suitable for numerous uses. Such heavy and extra heavy oil must usually be transported to distant consumption centers, however, which causes problems due to the viscous nature of the oil.

Numerous methods for transporting heavy and extra heavy oil have been disclosed, such as reducing viscosity of the oil with diluents and/or heat, providing oil in water dispersions and/or emulsions, and forming oil/water systems having the oil in a substantially stable core surrounded by a sleeve or substantially annular flow of water.

Heating and diluent processes are expensive. Oil/water systems are also problematic as the oil tends to adhere to pipeline and tubing walls upon contact with them, thus leading to restriction and eventual blockage of the flow system. Such problems are exacerbated where flow must be stopped for a period of time, allowing stratification of the oil and water phases and increased adhesion of the oil. Restarting the flow in such a stopped system may require a large pressure, even possibly exceeding the pressure rating of some or all components of the flow system. Such problems also necessitate the washing of the flow system to remove adhered oil, causing additional expense and down time of the flow system.

One known method for preventing adhesion of oil to flow surfaces of conduits in oil/water systems is to add salts such as silicates, borates, carbonates, sulfates, phosphates, and the like to the system water. Such addition of salt is discussed, for example, in U.S. Pat. No. 3,977,469 to Broussard et al. dealing with oil/water core flow as mentioned above. The addition of salt to the system water appears to help in reducing adhesion of oil to the conduit. However, the effects of the salt additive decrease with time as the salt is removed from the system by reaction with the oil, and also during periods of stopped flow where the water at least partially stratifies, allowing contact of the oil with the flow surfaces of the conduit and, thus, adhesion. Further, the added salt is an additional ingredient and, thus, an additional source of cost in the oil transportation process.

It is the principal object of the present invention to provide a conduit having an inner flow surface which substantially prevents the adhesion of oil.

It is a further object of the invention to provide such a conduit wherein the prevention of adhesion of heavy and extra heavy oil products does not decrease with time.

It is yet another object of the invention to provide a process for transporting crude oil in a flow system having conduits according to the invention which have an inner flow surface which substantially prevents the adhesion of 0:1, whereby the crude oil is more efficiently and cost effectively transported.

Other objects and advantages will appear hereinbelow,

SUMMARY OF THE INVENTION

The foregoing objects, and others, are attained by the disclosed invention.

According to the invention, a conduit is provided for transporting oil and water mixtures, wherein the conduit has an inner surface made from a substantially oleophobic and hydrophilic material which material provides a water absorption capacity of greater than or equal to about 8% by weight of the material and is further characterized by a contact angle with the oil of greater than or equal to about 120°. Such an inner surface substantially inhibits the adhesion of oil to the conduit. In accordance with the foregoing, the conduit is preferably coated with a concrete or polymeric resin coating or, in the case of concrete, the conduit may alternatively comprise a concrete pipe wherein at least the inner surface portion of the pipe has the appropriate oleophobic and hydrophilic characteristics.

A suitable concrete coating preferably includes silica in an amount of at least about 50%, preferably at least about 60% by weight, and is further characterized by a mean pore diameter of between about 0.10 $\mu$m to about 1.5 $\mu$m and a porosity of between about 15% to about 25%. This porosity may suitably be provided by utilizing silica with the proper gravel ratings.

A suitable polymeric composition preferably includes polymeric resin, preferably epoxy resin in a range of between about 70% to about 90% by weight of the polymeric composition, and polyvinyl alcohol in a range of between about 30% to about 10% by weight of the polymeric composition. Such a composition preferably provides a water absorption capacity of at least about 14% by weight of the polymeric composition, and a contact angle with the oil of at least about 160°. The polyvinyl alcohol preferably has a degree of hydrolysis in the range of at least about 40%.

Flow conductors, pipelines, and other transportation system elements provided with the above inner surfaces or coatings are substantially protected from undesirable adhesion of heavy and extra heavy crude oil.

BRIEF DESCRIPTION OF THE DRAWINGS

A detailed description of the preferred embodiments follows, with reference to the attached drawings, wherein.

DETAILED DESCRIPTION

Figure 1:
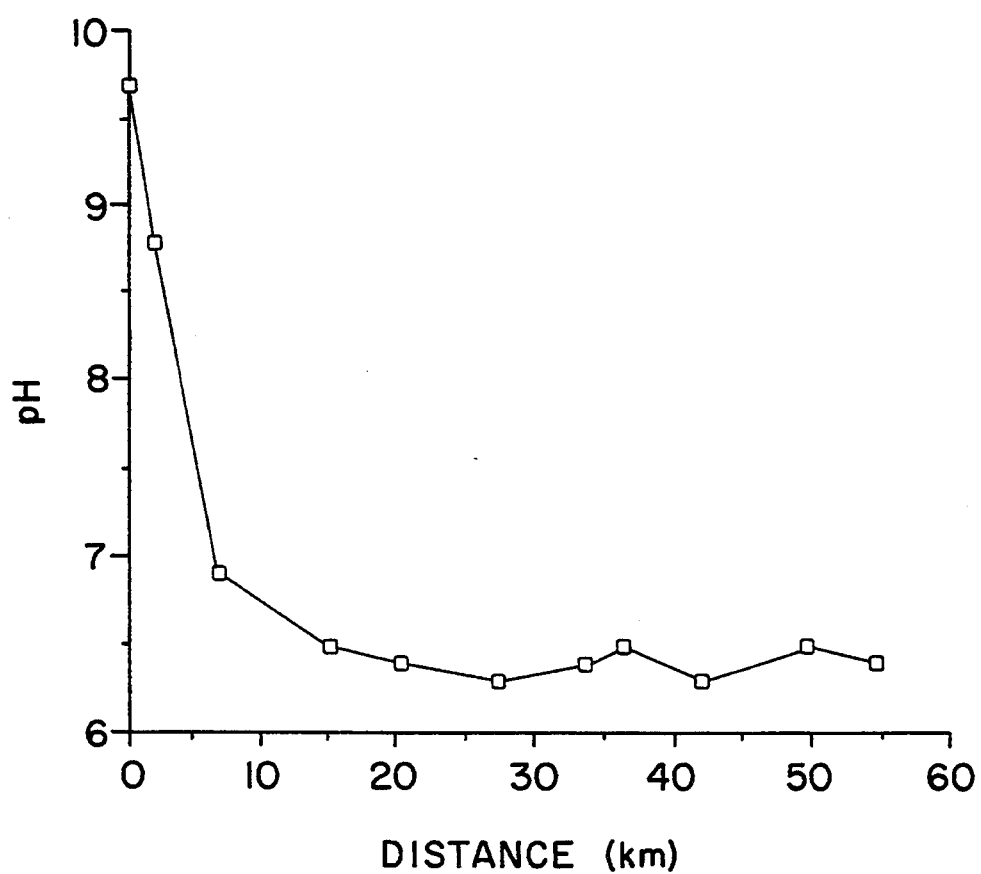
FIG. 1 is a graph illustrating the relation between pH and flow distance for a core annular flow test using a conventional salt additive.

The invention relates to the field of transportation of oil products, especially heavy and extra heavy oils, and is particularly drawn to a conduit which has an inner surface formed from an oleophobic and hydrophilic material which inhibits adhesion of heavy and extra heavy oils to the conduit so as to provide improved flow while avoiding shut downs and/or pressure losses due to blockage and partial blockage caused by such adhesion.

According to the invention, a conduit is provided which has an inner surface formed from a substantially oleophobic and hydrophilic material. When heavy and extra heavy oil is transported in the form of an oil/water system in a conduit according to the invention, the water tends to spread and coat or wet the inner surface, while oil has a high contact angle with the material of the inner surface and is therefore easily displaced by the water so as to prevent undesirable adhesion. The transport of oil in oil/water systems and core flow systems is described, for example in U.S. Pat. No. 3,977,469.

Conventional tubing or pipeline conduits, and especially commercial steel tubing, have an affinity for adhesion of heavy and extra heavy oil. The dynamic force of the flowing water in a core flow system is frequently insufficient to overcome the adhesion force of oil to such conventional tubing. Thus, the oil in a conventional system adheres and builds up to the point of obstructing flow. The inner surface material or coating of the present invention reduces the adhesion force of oil by increasing the contact angle of oil with the inner or flow surface, thereby allowing such adhered oil to be more easily displaced and carried away by the dynamic flow forces of the flowing water or other liquid flowing in the conduit. Thus, the present invention serves to inhibit blockage caused by oil adhesion by rendering oil which does adhere readily susceptible to displacement by flowing liquid.

According to the invention, the inner surface material of the conduit is characterized by a water absorption capacity of greater than or equal to about 8% by weight and has a contact angle with the heavy or extra heavy oil of at least about 120°.

It should be noted that the "contact angle", as referred to herein, is measured according to the "sessile drop" method which is a well known method generally used in the petroleum industry. Further, in order to obtain results more representative of flow line conditions, the measurement of contact angles are obtained as so-called "water advancing" contact angles, wherein an oil droplet is contacted with the surface in question, for example through a fine capillary tube, and water-advancing and water-receding values are obtained by altering the size of the droplet at the end of the capillary tube.

According to the invention, the inner surface material of the conduit preferably comprises a concrete substance or composition having a silica content by weight of at least about 50%, preferably at least about 60%. This silica content has been found to provide the inner surface with the desired oleophobic and hydrophilic characteristics and contact angle with oil. Silica is preferably provided in the form of a very fine dust, which further improves the water absorption capacity of the concrete. The concrete material according to the invention preferably has a mean pore diameter in the range of between about 0.10 $\mu$m to about 1.5 $\mu$m, and a porosity of between about 15% to about 25%. The pore size is important because a too small pore size could prevent absorption of water (and thus prevent wetting of the inner surface), while a too large pore size will allow absorption of both water and oil and, in such circumstances, removal of the oil from the pore spaces is difficult. Thus, the pore size should be selected so as to allow adsorption of water with substantially no absorption of oil.

A concrete material according to the invention can suitably be provided in transportation systems and the like through any conventional means whereby, for example, the inner surface of a pipeline may be provided with a concrete coating having the characteristics set forth above. Such a coating may suitably be applied to a conventional pipe made of steel or any other desired material. It is also noted that such a concrete substance or composition is suitable for use with a concrete pipe, wherein at least the inner surface portion of the pipe comprises a concrete substance having the characteristics set forth above. Methods for coating a pipe with concrete or other coatings are conventional and well known in the art, and any conventional method may be used for coating conduits in accordance with the invention. The actual method used for coating forms no part of this invention.

According to an alternate embodiment of the invention, the inner surface of the conduit may be coated with a polymeric resin coating material which may be applied to any desired flow conductor or other equipment for which oil adhesion is or may be a problem. According to the invention, the polymeric coating material preferably includes epoxy resin and polyvinyl alcohol (PVA) wherein the epoxy resin is present in the range of between about 70% to about 90% by weight of the epoxy resin and PVA, and the PVA is present in the range of between about 30% to about 10% by weight of the epoxy resin and PVA.

Examples of suitable epoxy resins include, but are not limited to, Scotch Kote 206N, by 3M, and NAPGAR, by O'Brian Co., although numerous other epoxy resins are available which would also be suitable. The polyvinyl alcohol preferably has a hydrolyzed percentage of at least about 40% and up to as much as 100%. Hydrolysis of the PVA has been found to be helpful in providing a polymeric coating which is insoluble in water. The polymeric coating is preferably characterized, according to the invention, by a water absorption capacity by weight of the coating material of at least about 14%, and a contact angle with oil of at least about 160°.

It should be noted that the conduit of the present invention is, of course, useful in numerous applications, but has been found to be ideal in preventing the adhesion of heavy and extra heavy crude oils having an API gravity below about 16 and preferably below about 13, especially where such oil is to be transported using the aforedescribed core flow method.

Transporting heavy and extra heavy oils in core flow systems is greatly facilitated by the present invention, as adhesion of the oil to inner surfaces of conduits is inhibited. These advantages are further demonstrated by the following examples.

EXAMPLE

This example demonstrates the deterioration of the effectiveness of conventional salt additives in deterring oil adhesion.

A 9.8 API gravity crude oil was transported in a core flow through a 55 km production line having a 6 inch diameter. A sodium silicate salt additive was added to the water of the core flow, and the pH of the system was monitored over flow distance. FIG. 1 illustrates the decrease in pH of the water over flow distance which, of course, represents a decrease in salt concentration and, accordingly, a decrease in the effectiveness of the salt additive in preventing oil adhesion. Such a decrease in the salt concentration is attributable to reaction of the salt with the crude and/or chemical anchoring of the salt within the tubing.

EXAMPLE 2

This example demonstrates the relation between the contact angle and the adherence of heavy and extra heavy oil with a concrete flow surface according to the invention.

Two concrete samples were provided. Sample 1 had a silica content by weight of 49%, with 50% of gravel 8/12 and 50% of gravel 12/16 (Int-4). Sample 2 had a silica content by weight of 64.8%, with 50% of gravel 8/12, 50% of gravel 16 (INT-4C). Both samples were submersed in water to obtain maximum water absorption, and then put in contact with a 9.8 API gravity oil. The sessile drop water advancing contact angle was then measured for each sample, and the results summarized below in Table 1.

TABLE 1

| SAMPLE | CONTACT ANGLE (degrees) | WATER ABSORPTION % (wt) | OBSERVATION |
| --- | --- | --- | --- |
| #1 (INT-4) | 110 | 8.8 | The tendency of oil to spread on or adhere to surface is over 60 percent. |
| #2 (INT-4C) | 145 | 8.4 | The tendency of oil to spread on or adhere to surface is less than 5 percent. |

EXAMPLE 3

This example demonstrates the relation between water absorption and oil adherence with a concrete surface.

Two concrete samples were provided. Sample 1 had a silica content by weight of 64.8%, with 50% of gravel 8/12 and 50% of gravel 12/16 (INT-4C). Sample 2 had a silica content by weight of 62.4%, with 50% of gravel 8/12 and 50% of gravel 12/16 (Int-2C). Both samples were submersed in water to obtain maximum water absorption, and then contacted with a 9.8 API gravity oil. The water advancing contact angle was determined using the sessile drop method for the two samples. The results are set forth in Table 2.

TABLE 2

| SAMPLE | CONTACT ANGLE (degrees) | WATER ABSORPTION % (wt) | OBSERVATION |
| --- | --- | --- | --- |
| #1 (INT-4C) | 145 | 8.4 | The tendency of oil to spread on or adhere to surface is less than 5 percent |
| #2 (Int-2C) | 128 | 7.45 | The tendency of oil to spread or adhere to surface is over 50 percent. |

EXAMPLE 4

This example compares the effect of using a concrete coated tubing according to the invention to a conventional carbon steel tubing.

Figure 2A:
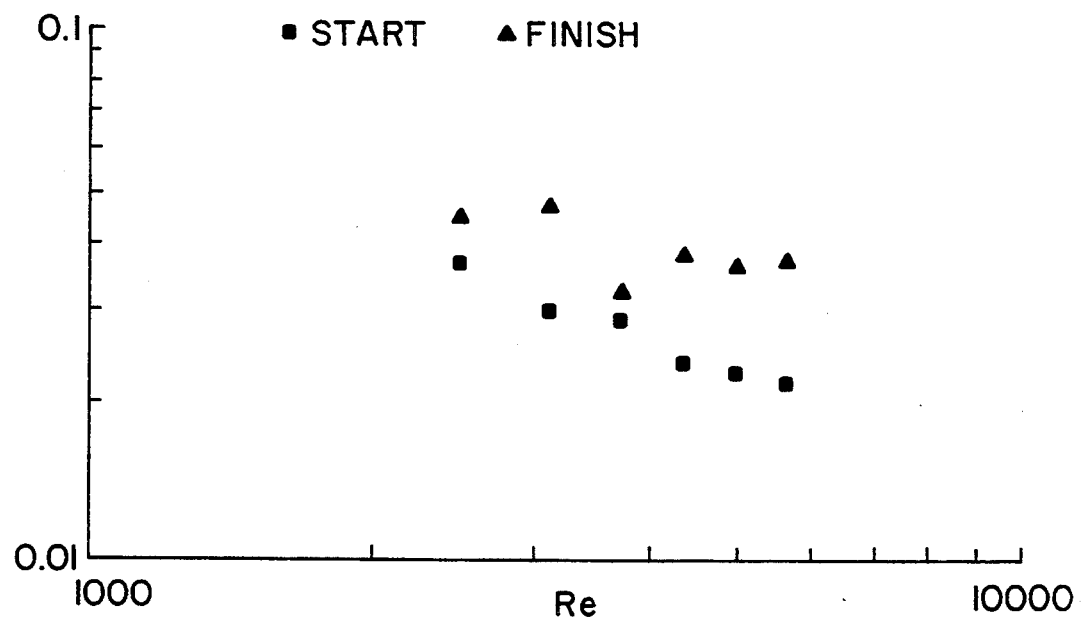
FIGS. 2a and 2b compare Reynolds number (Re) and friction factor (f) for a conventional carbon steel pipeline (FIG. 2a) and a cement lined pipeline according to the invention (FIG. 2b).
Figure 2B:
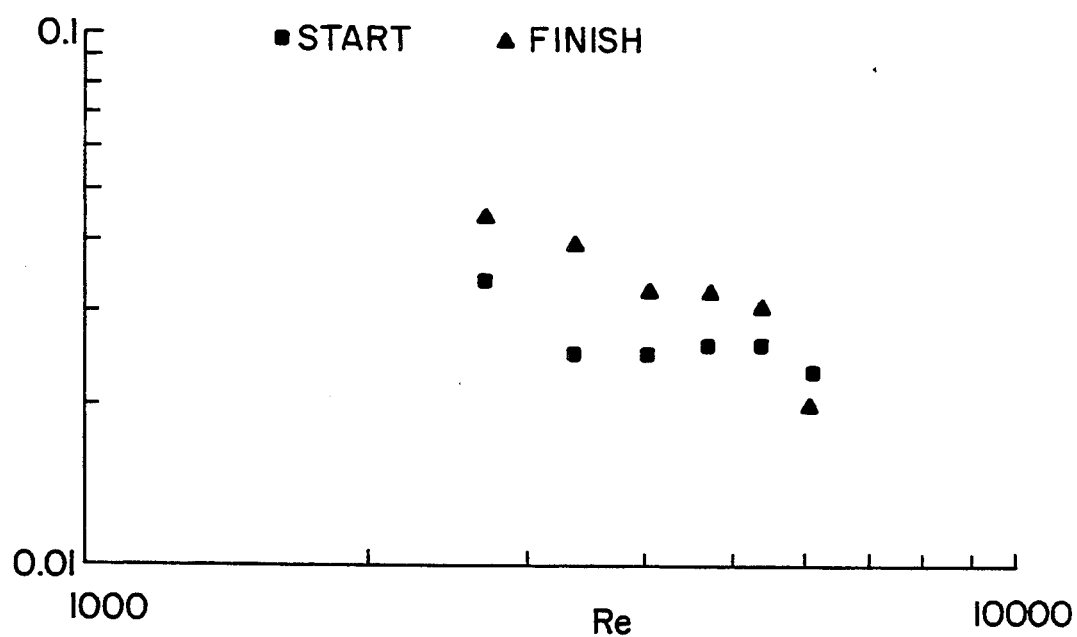

A dynamic test was conducted using a 2 inch diameter transport circuit that had two tubing sections. Section #1 was a 3.2 m section made of carbon steel, and section #2 was a 3.48 m section coated with concrete having a silica content by weight of 65.2%, and a porosity of 19%. Oil having an API gravity of 11.6 at 60° F. was formed into a core flow in water and was circulated through the circuit, and pressure and flow data were taken. FIGS. 2a and 2b illustrate the results obtained as a function of friction factor (f) vs. Reynolds number (Re) (based on various flow velocities) at the start and finish of the test. The friction factor is a measure of pressure lost due to adhesion of oil to the surface. The carbon steel pipe suffered from a greater increase in friction factor.

EXAMPLE 5

This example demonstrates the effect of contact angle and water absorption using a polymeric resin coating.

Five Samples (VS1-VS5) were prepared using various concentrations by weight of epoxy resin (Scotch Kote 206N, 3M) and polyvinyl alcohol (PVA), the polyvinyl alcohol having various hydrolysis percentages, as set forth in Table 3. The samples were submersed in water and contacted with a 9.8 API gravity oil, and sessile drop water advancing contact angles were measured. The results are also set forth in Table 3.

TABLE 3

| SAMPLE | PVA/Epoxy WT %/WT % | PVA Hydrolysis % | CONTACT ANGLE (Degrees) | WATER ABSORPTION % (wt) | OBSERVATION |
| --- | --- | --- | --- | --- | --- |
| VS1 | 0 | — | 126 | 1.2 | Oil adhesion |
| VS2 | 20/80 | 72.5 | 169 | 29.0 | No adhesion |
| VS3 | 20/80 | 48.5 | 168 | 14.3 | No adhesion |
| VS4 | 20/80 | 72.5 | 165 | 17.4 | No adhesion |
| VS5 | 10/90 | 88.0 | 165 | — | some spots |

VS1, having no coating, exhibited oil adhesion, while VS2-VS5, especially VS2-VS4, provided excellent protection against oil adhesion.

EXAMPLE 6

This example further demonstrates the effect of a polymeric resin coating in preventing oil adhesion.

A polymeric resin coating was applied to a cylinder of inch diameter and 1 foot length. The coating contained 80% by weight of epoxy resin, and 20% PVA having a hydrolysis percentage of 77.5%. A mixture of 9.8 API gravity oil and water having an oil-water ratio by weight of 80/20 was placed in the cylinder and the cylinder was rotated using a rolling cylinder test apparatus for 24 hours. The coated surface of the cylinder at the end of the test was free of oil depositions.

Thus disclosed is an improved coating surface for use with transport systems, especially for heavy and extra heavy oil in water systems, which inhibits the adhesion of such oil to the coated surface and thereby provides a more efficient transport of the oil. Further, the improvements provided remain substantially stable over time and do not degenerate as do conventional treatments such as the aforedescribed conventional addition of salt to the water of the oil/water system.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A conduit for transporting an oil and water mixture, wherein the conduit has an inner surface, said inner surface being formed from a hydrophilic and oleophobic material, said hydrophilic and oleophobic material being characterized by a water absorption capacity of greater than or equal to about 8% by weight of said hydrophilic and oleophobic material, and by a contact angle with oil of greater than or equal to about 120°, whereby adhesion of oil to said inner surface is substantially inhibited.

2. A conduit according to claim 1, wherein the inner surface comprises a concrete coating having a silica content of greater than or equal to about 50% by weight and is further characterized by a mean pore diameter of between about 0.10 $\mu$m to about 1.5 $\mu$m and a porosity of between about 15% to about 25%.

3. A conduit according to claim 2, wherein the concrete composition has a silica content of greater than or equal to about 60% by weight.

4. A conduit according to claim 1, wherein the conduit comprises a steel pipe and wherein the inner surface comprises a concrete coating having a silica content of greater than or equal to about 50% by weight and is further characterized by a mean pore diameter of between about 0.10 $\mu$m to about 1.5 $\mu$m and a porosity of between about 15% to about 25%.

5. A conduit according to claim 1, wherein the conduit comprises a concrete pipe and wherein at least the inner surface of the concrete pipe comprises a concrete composition having a silica content of greater than or equal to about 50% by weight and characterized by a mean pore diameter of between about 0.10 $\mu$m to about 1.5 $\mu$m and a porosity of between about 15% to about 25%.

6. A conduit according to claim 1, wherein the inner surface comprises a polymeric coating having a water absorption capacity of greater than or equal to about 14% by weight of said polymeric coating, and having a contact angle with the oil of greater than or equal to about 160°.

7. A conduit according to claim 6, wherein the polymeric coating comprises a polymeric resin composition.

8. A conduit according to claim 7, wherein the polymeric resin composition includes epoxy resin and polyvinyl alcohol, wherein the epoxy resin is present in the range of between about 70% to about 90% by weight of the epoxy resin and polyvinyl alcohol, and the polyvinyl alcohol is present in the range of between about 30% to about 10% by weight of the epoxy resin and polyvinyl alcohol.

9. A conduit according to claim 8, wherein the polyvinyl alcohol has a hydrolysis degree of at least about 40%, whereby the polymeric coating is substantially water insoluble.

10. A conduit according to claim 1, wherein the conduit is selected from a group consisting of concrete pipes and steel pipes, and wherein the inner surface comprises a polymeric coating having a water absorption capacity of greater than or equal to about 14% by weight of said polymeric coating, and having a contact angle with the oil of greater than or equal to about 160°.

11. A process for transporting an oil and water mixture, comprising the steps of:
providing a conduit having an inner surface formed from a hydrophilic and oleophobic material, said hydrophilic and oleophobic material being further characterized by a water absorption capacity of greater than or equal to about 8% by weight of said hydrophilic and oleophobic material and a contact angle with oil of greater than or equal to about 120°; and
flowing the oil and water mixture through the conduit, whereby water wets the inner surface and substantially prevents adhesion of oil thereto.

12. A process according to claim 11, wherein oil of the oil and water mixture has an API gravity of less than about 16.

13. A process according to claim 12, further including the step of forming an oil/water system comprising a substantially stable core of oil in a substantially annular layer of water and flowing the oil/water system through the conduit.

14. A process according to claim 11, wherein the step of providing the conduit includes the step of coating the inner surface of the conduit with a concrete coating having a silica content of greater than or equal to about 50% by weight and further characterized by a mean pore diameter of between about 0.10 $\mu$m to about 1.5 $\mu$m and a porosity of between about 15% to about 25%.

15. A process according to claim 14, wherein the concrete composition has a silica content of greater than or equal to about 60% by weight.

16. A process according to claim 11, wherein the step of providing the conduit includes the step of coating the inner surface of the conduit with a polymeric coating having a water absorption capacity of greater than or equal to about 14% by weight of said polymeric coating, and having a contact angle with the oil of greater than or equal to about 160°.

17. A process according to claim 16, wherein the polymeric coating comprises a polymeric resin composition.

18. A process according to claim 17, wherein the polymeric resin composition includes epoxy resin and polyvinyl alcohol and wherein the epoxy resin is present in the range of between about 70% to about 90% by weight of the epoxy resin and polyvinyl alcohol, and the polyvinyl alcohol is present in the range of between about 30% to about 10% by weight of the epoxy resin and polyvinyl alcohol.

19. A process according to claim 18, wherein the polyvinyl alcohol has a hydrolysis degree of at least about whereby the polymeric coating is substantially water insoluble.

* * * * *

UNITED STATES PATENT AND TRADEMARK OFFICE
CERTIFICATE OF CORRECTION

PATENT NO. : 5,385,175
DATED : JANUARY 31, 1995
INVENTOR(S) : MAYELA RIVERO ET AL.

It is certified that error appears in the above-indentified patent and that said Letters Patent is hereby corrected as shown below:

IN COLUMN 4, THE HEADING "EXAMPLE" SHOULD READ --EXAMPLE 1--.

IN COLUMN 5, LINE 11, AFTER "GRAVEL" DELETE "16" AND INSERT --12/16--.

IN COLUMN 6, LINE 58, BETWEEN "OF" AND "INCH" INSERT --3--.

IN COLUMN 8, CLAIM 19, LINE 63, BETWEEN "ABOUT" AND "WHEREBY" INSERT --40%--.

Signed and Sealed this

Tenth Day of October, 1995

Attest:

BRUCE LEHMAN

*Attesting Officer*  *Commissioner of Patents and Trademarks*